United States Patent [19]
Metz

[11] 4,274,863
[45] Jun. 23, 1981

[54] METHOD OF TREATING POLLUTANT-LADEN GASES, ESPECIALLY FROM A STEEL-MAKING OR COKING PLANT

[75] Inventor: Paul Metz, Luxembourg, Luxembourg

[73] Assignee: Arbed S.A., Luxembourg, Luxembourg

[21] Appl. No.: 972,348

[22] Filed: Dec. 22, 1978

[30] Foreign Application Priority Data

Dec. 30, 1977 [LU] Luxembourg ............................ 78800

[51] Int. Cl.³ .............................................. C22B 1/20
[52] U.S. Cl. ............................................... 75/5; 75/3; 75/29; 201/4; 201/29; 201/43; 266/144; 266/156; 423/210
[58] Field of Search ........................................ 75/3–5, 75/29, 36, 41; 266/144, 156; 201/4, 43, 29; 423/231, 215.5, 210 C; 55/523

[56] References Cited

U.S. PATENT DOCUMENTS

| 3,332,770 | 7/1967 | Wendt, Jr. et al. ........................ 75/5 |
| 3,789,104 | 1/1974 | McCawley ........................ 423/210 C |
| 4,002,465 | 1/1977 | Brusa ............................................. 75/40 |
| 4,023,960 | 5/1977 | Seidal et al. ................................. 75/5 |
| 4,145,795 | 2/1979 | Koizumi et al. ...................... 266/156 |

FOREIGN PATENT DOCUMENTS

| 827622 | 2/1960 | United Kingdom . |
| 1219269 | 1/1971 | United Kingdom . |
| 1416053 | 12/1975 | United Kingdom . |
| 1533715 | 12/1978 | United Kingdom . |
| 631538 | 10/1978 | U.S.S.R. ...................................... 75/36 |

OTHER PUBLICATIONS

"Abgasreinigunsanlagen in der Eisen–und Stahlindustrie und ihre Kosten" *Jaha. Mitterbingen* Bd. 68, p. 434 (1975).

"Saubere Mullverbrennungsanglage", UMSCHAU 75, p. 580, Heft 18, (1975).

*Primary Examiner*—Michael L. Lewis
*Attorney, Agent, or Firm*—Karl F. Ross

[57] ABSTRACT

Pollutant-containing gases which are generated in a steel-making and/or coking plant are mixed with fresh air in at least one stream and passed through an incandescent bed of minerals, e.g. the sintering cake of an ore-sintering furnace. The resulting gases are then subjected to gas cleaning in at least one filtering or washing station.

6 Claims, 1 Drawing Figure

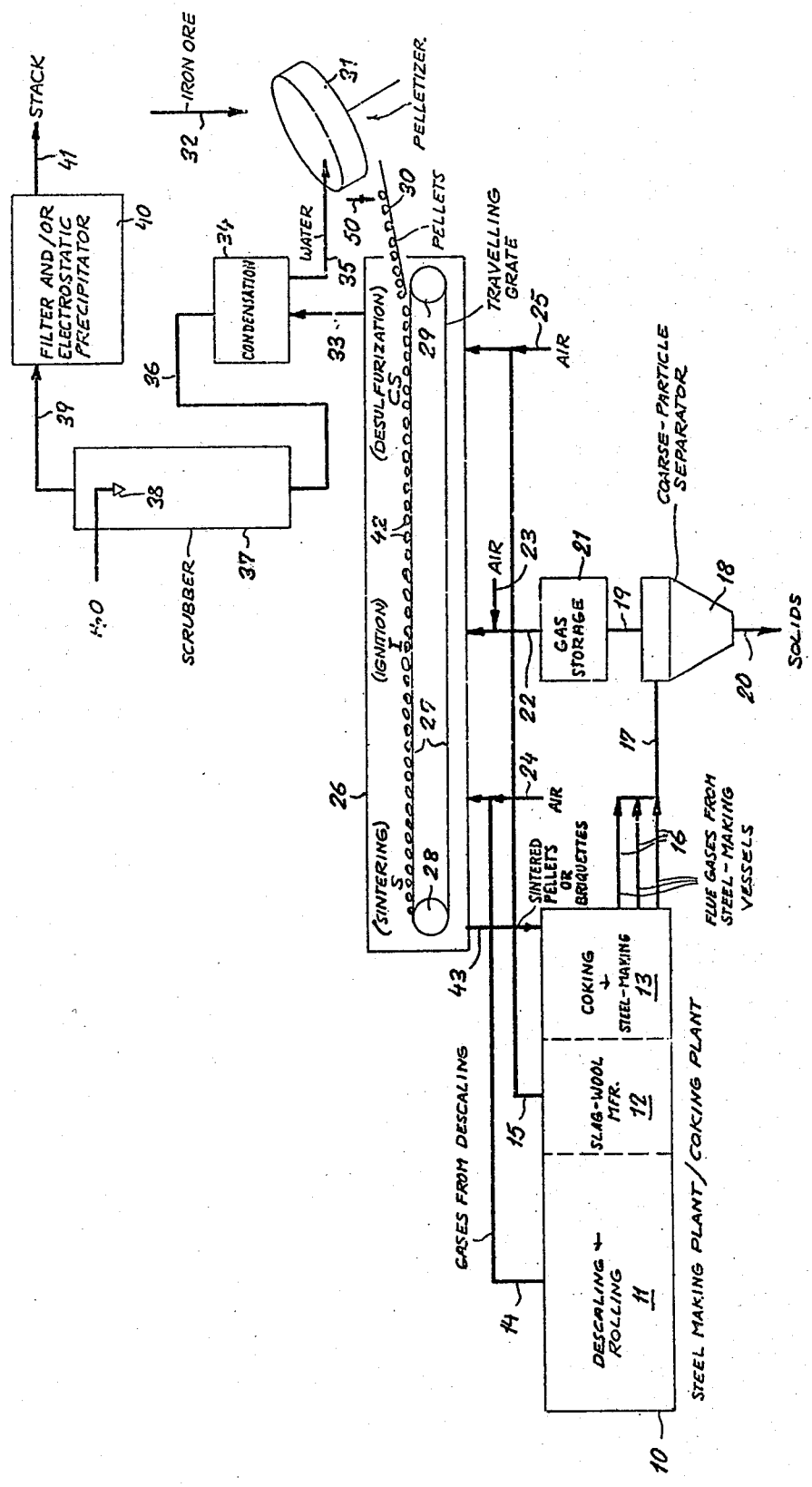

METHOD OF TREATING POLLUTANT-LADEN GASES, ESPECIALLY FROM A STEEL-MAKING OR COKING PLANT

FIELD OF THE INVENTION

The present invention relates to a method of treating pollutant-laden gases, especially air, which can be generated in a steel-making and/or coking plant and, more particularly, in a metallurgical process. The invention is also related to a method of operating a metallurgical plant.

BACKGROUND OF THE INVENTION

In the various operations which are carried out in steel making and coking plants and, more generally, in metallurgical plants, there are generated polluted air and gases of varying compositions. Most of these gases are laden with pollutants which must be completely removed or at least partly removed before the gases can be discharged into the environment, i.e. the ambient atmosphere.

Although some of these pollutants may be solids or gases which can conceivably be recycled in an industrial process, their concentrations are often too low to make recycling operations financially attractive.

For example, combustion gases are generated during the steel-making process and contain, in addition to nitrogen, carbon dioxide, oxygen and carbon monoxide. The carbon monoxide is a gaseous fuel which frequently is not convenient to recover because the concentration of the carbon monoxide varies widely during the steel making process. As a result only limited amounts of such exhaust gases are worthwhile reusing directly although they may be used to recover sensible heat. On the other hand, the combustible content of such gases, if simply scrubbed or otherwise treated to be freed of their pollutants, are lost and adversely effect the thermal balance of the system.

In addition, the air in steel making plants sporadically becomes laden with dust and gases which contain no components which are reusable economically and thus only pollutants. For example, in the production of slag sand or slag wool, in which molten blast furnace slag is treated with water, steam and/or air, there is generated an atmosphere which is latent with hydrogen sulfide and slag-wool particles which are of unpleasant odor and cause difficulties in breathing. These gases are detrimental both to the environment and to the worker in the plant. Dust-laden gases also are generated during the tapping of blast furnaces, the descaling of steel sheet, the flame-drying of freshly prepared ladles, the metallurgical treatment of pig iron or steel in ladles etc.

Coking plants produce steam during the charging of the coke ovens and during the quenching of the coke. The steam which is thus evolved and constitutes one of the gases which are treated in accordance with the present invention, contains dust and coking gases. This contaminated gas cannot be reused technologically and is difficult to clean.

As a result of the varied compositions of the various contaminated gases which are generated in a steel making plant and/or a coking plant or, more generally, in metallurgical operations, there is the need to provide a multitude of cleaning devices operating under varying principles and with sophisticated hardware in any plant of a considerable size.

For example, in some cases it is necessary to provide special burners to burn off the carbon monoxide generated in steel making processes and contained in flue gases. When the combustion is not adequate, it is necessary to use dry or wet filtration or to run the flue gases through sophisticated scrubbing columns.

OBJECTS OF THE INVENTION

It is the principal object of the present invention to provide an improved method for the treatment of various waste gases of a metallurgical plant so that the result of the treatment is a gas which can be released into the atmosphere without any problem.

Another object of the invention is to provide a uniform treatment for pollutant-laden gases from the sources described above which permits, regardless of the varying compositions of the gases and the concentrations of the contaminating components, a single treatment station to be used.

It is also an object of this invention to provide an improved method of operating a steel making and/or coking plant or, more generally, a metallurgical plant, so that the various pollutant-containing gases can be treated economically and efficiently, with minimum loss in fuel components, and the cleaned gas product can be discharged into the environment without difficulty.

SUMMARY OF THE INVENTION

These objects and other which will become apparent hereinafter are attained, in accordance with the present invention, in a method which comprises passing the gases from various sources in the steel making and/or coking plant to a central station and passing them in admixture with fresh air in at least one stream through an incandescent bed of minerals. Thereafter, the gases subjected to this treatment are given a supplementary cleaning in at least one filtering or washing station.

The incandescent bed which is used in accordance with the present invention has the sole means for treating all of the various gases prior to the scrubbing or filtration, is the sintered cake of an ore sintering plant in which the combustion air or treating gases (i.e. roasting gases) are partly replaced by the pollutant-laden gases from various locations in the steel making and/or coking plant. The total quantity of gases recovered from the ore-sintering plant are treated in a cleaning station which can be part of the sintering plant and can be any station used for the conventional cleaning of the gases arising from the sintering plant without modification because of the very nature of the gases which have been substituted in part for air in the sintering operation.

The fuels normally used for sintering purposes are coking fines and lean coal which are burned with oxygen from the air. During the combustion of these fuels which show little reactivity, the reaction $C+O_2 \rightarrow CO_2$ and the equilibrium $2CO \rightleftarrows C+CO_2$ both act within the sintering bed. By adjusting the fuel input, the air input and the quantities of the gases which are substituted in part from air, it is possible to reduce the carbon monoxide concentration in the gases leaving the sintering bed to a minimum. Since the pollutant-containing gases have a certain fuel value, frequently it is not necessary to add as much coking fines and lean coal to the pellets.

Thus one may partly replace the amount of fresh air needed for the sintering process by pollutant-laden air or by other contaminated gases which contained primarily carbon dioxide, carbon monoxide, oxygen and nitrogen.

While the pollutant-laden gases pass through the incandescent bed, their gaseous components (carbon dioxide, carbon monoxide and oxygen) are integrated into the combustion reactions in which carbon monoxide levels are reduced to a minimum, thereby improving the overall energy balance because heat energy is obtained from the carbon monoxide.

Pollutants such as methane, sulfur or hydrogen sulfide are oxidized and the products are collected in the cleaning station to which the sintering bed is connected. Polluted steam or vapors are condensed and cleaned on contact with the incandescent bed and partly decomposed while dust-like pollutants are fixed upon the materials which undergo sintering.

It has been found to be advantageous and is the best mode currently known for carrying out the invention in practice, to introduce those gases which have the highest calorific value close to the ignition zone of the sintering bed. This selective introduction of the gases permits optimum reuse of the combustible components of the gases and again improves the energy balance.

Gases which contain a particular pollutant, e.g. sulfur, can be introduced into the very zone of the sintering bed in which, during normal sintering operations, there is notoriously a concentration and subsequent decomposition of the same pollutant. Such zones in sintering beds include the desulfurization zone in which sulfurous compounds are concentrated and are decomposed. Thus those descaling gases which contain particulates may be introduced directly into the sintering zone while the gases from slag or manufacture which contain high concentrations of sulfurous components can be introduced into the desulfurization or upstream zone of the sintering bed. By a knowledge of the local conditions, the cleaning operations may be carried out with great specificity and a uniform product gas.

Depending upon the nature and concentration of the pollutants contained in the raw gases which are to undergo cleaning according to the invention, it may be desirable to perform a preliminary curde dust removal. This is advantageous because an excessive layer of mineral dust upon the sintering bed may adversely effect its permeability and hence the productivity of the system.

Though the gases from the steel making or coking plant are usually directly introduced into the sintering furnace, it has been found to be advantageous in some cases to collect all the gases from the respective sources at one central station, e.g. a gas holder. In this way it us possible to release the gases to the sintering bed at the rates required and to level out fluctuations in the content of contaminants in the mixed gases which are to undergo cleaning. Such fluctuations may interfere with the normal operations of the sintering plant.

Use of a gas holder is therefore recommended when one of the various sources of gases shows a major output fluctuation, e.g. when flue gases are evolved from steel making vessels which have highly variable concentrations of carbon monoxide, carbon dioxide, oxygen and nitrogen and these gases are the major pollutant-laden gases within the plant.

The method of the present invention has been found to have a significant advantage which is that the centralized cleaning of pollutant-laden gases, wherever they are produced, makes individual cleaning or converting stations superfluous and allows the use for the final cleaning operation of a unit which already exists for cleaning the gases from a sintering plant. There are, of course, other advantages which have been mentioned previously, namely, their recovery of the calorific value of combustible components and the like.

According to another feature of the invention, polluted condensed water is used for moisturizing purposes in the pelletizing system for the sintering plant, i.e. in the mixer and roller drum.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the principles of the present invention.

SPECIFIC DESCRIPTION AND EXAMPLE

In the drawing, there is diagrammatically illustrated a steel making and coking plant 10 which can have, for example, a descaling and rolling mill 11, a slag-wool or slag-sand manufacturing station 12 and the usual steel making station 13 which is combined with the coking plant in the illustration shown.

The flue gases from the steel making vessels and the various gases arising in the coking operation are collected as represented at 16 and are fed in common at 17 to a coarse-particle separator such as a cyclone 18 from which the solids can be recovered at 20 and introduced into the pelletizer 31 together with iron ore 32 and coke particles or dust or coal particles or dust. This fuel can also be added at 50 to the pellets directly upon the travelling grate 27 of a sintering furnace 26 to be described subsequently.

The flue gases which have been subjected to coarse particle separation are then delivered at 19 to a gas storage tank 21 which levels out varying compositions of the contaminants in the flue gases, the gases then being supplied at 22 together with air which is introduced at 23 to the ignition zone I of the sintering plant 26.

The pellets 30 are introduced into the sintering plant from the pelletizer 31 and pass first through a desulfurization or roasting stage CS on the travelling grate 27 which passes over rollers 28 and 29. The roasted and thus preheated ore pellets 42 are then subjected to ignition in the ingition stage I, thereby heating the pellets by the combustion of the fuel which has been added and/or by partial combustion of combustible components in the flue gases which are supplied by a line 22 to the ignition stage.

The pellets then travel to the sintering zone where the heating is maintained until the pellets have the desired degree of stability.

The sintered pellets are delivered at 43 to the steel making plant 13.

Gases from the descaling and rolling operations are fed as shown at 14 with air which is introduced at 24 to the sintering operation.

Gases from the slag-wool manufacturing station 12 are delivered by a line 15 and mixed with air at 25 to feed the desulfurization stage CS since these gases have a relatively high concentration of hydrogen sulfide and like sulfur-containing substances.

The product gases from the sintering plant 26 may be cooled to condense water therefrom in the condensation unit 34, the water being delivered at 35 as the moisturizing liquid to the pelletizer or wherever water may be required. After condensation of water vapor from the contaminated gases, the latter are supplied at 36, for example, to a scrubber 37 in which they are scrubbed with water to which calcium oxide may be added to bind up a carbon dioxide. The water from this process may also be used as a moisturizer for the pelletizers or may be subjected to precipitation of the calcium carbonate and recycling. Such a scrubber is conventional in the art and is well known for the processing of waste gases from industrial processes.

The use of a filter 40 to which the scrubbed gases are delivered at 39 is, of course, optional, and the filter 40 and/or an electrostatic precipitator may be substituted for the scrubber 37 since the gases subsequent to condensation at 34 are sufficiently clean to be discharged into the atmosphere through the stack 41.

Iron ore is delivered to the pelletizer 32. Various modifications in the system shown in the drawing are, of course, possible with the gases from the descaling at 14 and from the slag-wool manufacture at 15 being provided with respective gas storage receptacles as has been shown at 21 or being delivered to the gas storage vessel 21 which has been illustrated.

The coarse-particles separated at 18 may also be eliminated if the flue gases do not contain an excess of solids. If any of the gases contain an excessive quantity of solids, they too may be subjected to coarse-particle separation, e.g. in a cyclone as illustrated.

SPECIFIC EXAMPLE

A steel-making plant 13 is used, including an LD-AC converter with an output of 4,000 tons/day and flue gas at a rate of 11,200 cubic m/hour (stp) with a heat value of 20 million kcal/hour as the thermal yield of CO in the gas which consists of about 60 percent CO and 40 percent carbon dioxide by volume.

The storage vessel 21 has a capacity of about 6,000 cubic meters.

The sintering bed 42 which requires 24 million kcal/hour is supplied with the gas at a rate of about 30,000 cubic meters/hour and produces 400-500 tons per hour of iron ore pellets. The conveyor speed is 3 to 5 meters/minute and 50 kg of water is used in the pelletizing drum per ton of sintered material.

The other gas fed to the zone of the bed is air containing 60 percent volume of water vapor and 0.02 percent of sulfur dioxide and hydrogen sulfide, this gas being derived from the slag-wool plant 12 which produces 100-200 kg of slag wool per hour operating 6 to 8 hours a day.

Air and waste gases are supplied from the descaling plant 11 and the remaining heat value required for the sintering (about 4 million kcal/hour) is supplied by combustion of coke in the pellets.

I claim:

1. A method of treating pollutant-laden gases from a metallurgical plant which produces a number of such gases of different compositions, said method comprising the steps of:
    (a) transporting all of said gases from said plant to a central cleaning station;
    (b) passing the gases at said central cleaning station in admixture in at least one stream through an incandescent mineral bed in the form of a sintered cake of an ore-sintering plant whose combustion air is at least partly replaced by at least some of the pollutant-laden gases from said metallurgical plant;
    (c) obtaining gases after passage through said bed and subjecting the obtained gases to a supplementary cleaning in a further gas-cleaning station forming part of said sintering plant; and
    (d) condensing water from gases derived from said bed and using the condensed water as a moisturizer for a mixer or pelletizer of the sintering plant.

2. The method defined in claim 1 wherein pollutant-laden gases transported in step (a) are introduced into said bed close to the ignition zone thereof.

3. The method defined in claim 1 in which said bed has regions at which concentrations of various contaminants are greater than elsewhere and at least one of said gases contains one of said contaminants, said method comprising introducing said one of said gases into said bed at a region thereof in which said bed contains said one of said contaminants.

4. The method defined in claim 1 wherein at least some of the pollutant-laden gases transported in step (a) are subjected to a coarse preliminary dust-removal operation.

5. The method defined in claim 1 wherein at least some of the pollutant-laden gases transported in step (a) are fed to a gas holder prior to passage into said bed.

6. The method defined in claim 1 wherein the pollutant-laden gases are derived from a steel making or coking plant.

* * * * *